United States Patent Office 3,813,286
Patented May 28, 1974

---

3,813,286
FUEL ELEMENT WITH FAILURE INDICATOR
Arthur J. Goldman, White Plains, N.Y., D. Garth Rowe, San Jose, Calif., and Cecil Roy Jones, Orange, Conn., assignors to Transfer Systems Incorporated, North Haven, Conn.
Filed May 8, 1972, Ser. No. 251,016
Int. Cl. G21c 17/06
U.S. Cl. 176—19 R                  6 Claims

ABSTRACT OF THE DISCLOSURE

A novel fuel element for use in a power-generating nuclear reactor is described. The fuel element features a built-in indicator to indicate failure, and is especially adapted for use in a fuel assembly having a removable top closure. In a preferred embodiment, the indicator is a spring loaded movable pin which is displaced outwardly when the reactor is shut down by the internal element gas pressure. Should the element develop a leak, the spring causes retraction of the pin indicator. A failure sensor is also described.

---

This invention relates to a novel fuel element for use in a power-generating nuclear reactor.

Commercial nuclear reactor power generators of the boiling water reactor (BWR) type and of the pressurized water reactor (PWR) type commonly employ as the fuel elements (sometimes called fuel pins or rods) a plurality of sealed elongated tubes of a suitable corrosion-resistant metal whose interior is packed with fuel pellets, typically of uranium dioxide. During operation of the reactor, due to the high temperatures and radiation levels involved, the tube wall can develop leaks, which can cause discharge of radioactive materials into the reactor coolant. This is highly undesirable for a number of reasons, including difficult maintenance problems of decontaminating the coolant as well as all objects brought into contact with the coolant. There are a variety of types of fuel failures, ranging from a very small pinhole that permits only gas leakage, to a major fuel rod cladding rupture through which pellet materials get out into the coolant.

It is therefore important for safety as well as economic reasons to obtain quick identification of failed fuel and its immediate removal from the reactor core.

One method currently in use involves a special sipping device which is sealed to the core grid, after which an air bubble is introduced to displace the water causing overheating of the fuel assemblies, and then a coolant sample extracted and tested for the presence of increased radioactivity due to local fuel failures. This radiochemical method, while a considerable improvement over earlier techniques in that it helps localize the failed fuel, is nevertheless somewhat complicated, in obtaining and handling the liquid samples required and in requiring the use of sensitive equipment for detecting radioactivity, and also may not be fully effective in detecting either very small leaks or very large leaks. A very small leak may not provide sufficient radioactivity to be detected in a diluted sample, and a very large leak, such as loss of a wall segment, can result in coolant leaching of so much of the fuel fission products that insufficient radioactive material remains to be detected by the sipping process.

The chief object of the invention is a fuel element capable of providing a positive indication whenever a failure occurs in the fuel cladding.

This and other objects of the invention are achieved with a fuel element construction provided with means responsive to a loss in gas pressure within the fuel container to provide a positive indication of fuel failure. In a preferred embodiment, a displaceable spring-loaded pin is provided in pressure responsive relationship to a pressurized fuel container. Any leak in the fuel cladding causing a loss in internal gas pressure will cause retraction of the spring-loaded pin. Thus any fuel element without a protruding pin represents aa positive indication of fuel failure. The absence of the protruding pin can be readily detected before or after removal of the fuel assembly top closure under which the fuel element is mounted.

The invention will now be described in greater detail with reference to the accompanying drawings wherein.

Figures 1, 2:
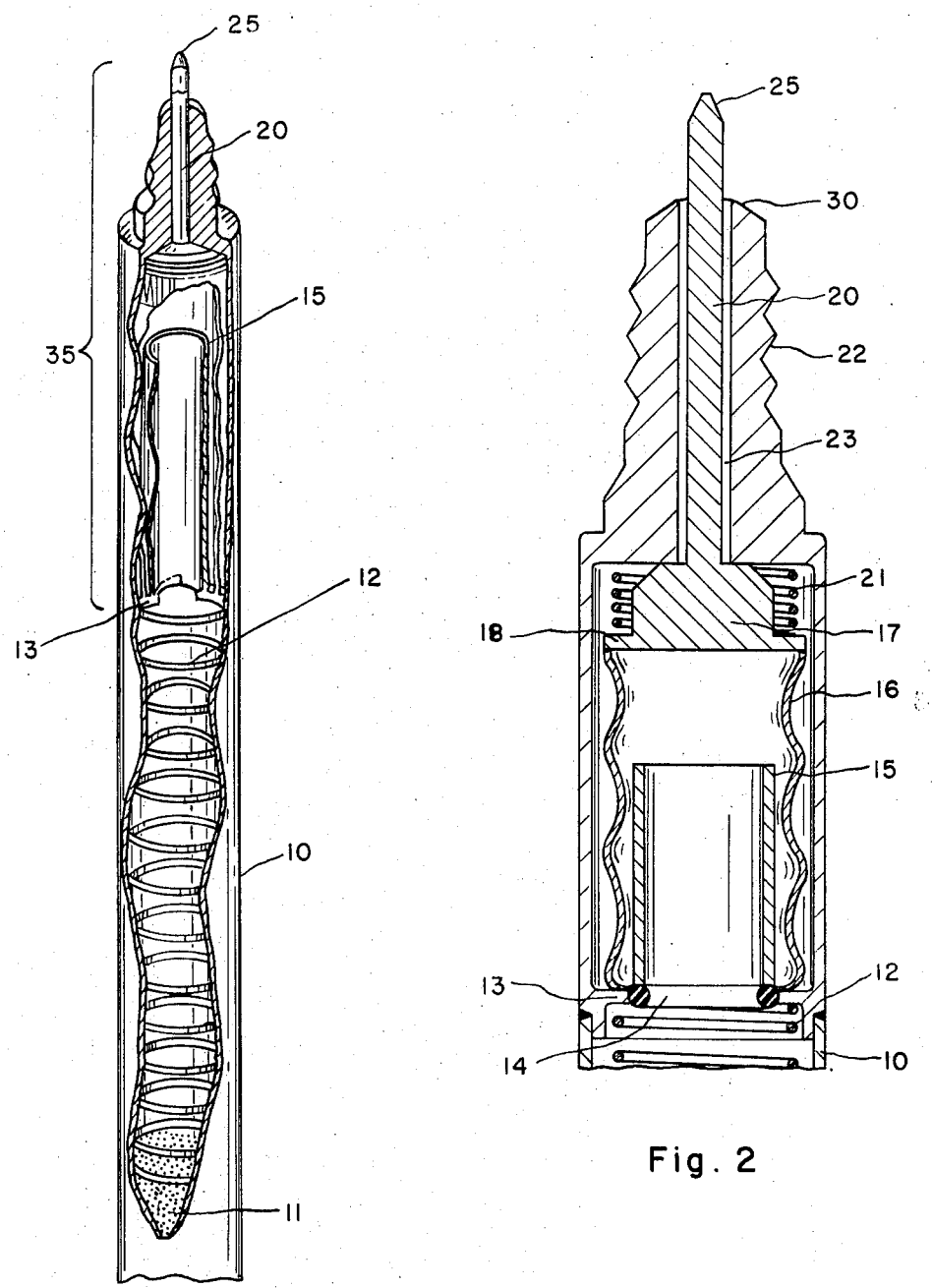
FIG. 1 is a perspective view of the upper end of a fuel element in accordance with the invention, with part of the outer cladding cut away to show the interior.
FIG. 2 is a cross-sectional view of the top of the fuel element of FIG. 1.

Referring now to the drawing, FIG. 1 is a perspective view of the upper part of one form of fuel element in accordance with the invention. It comprises an elongated tube 10 of corrosion-resistant metal, such as stainless steel or a zirconium alloy. The bottom end, not shown, is sealed in a gas-tight manner. The interior of the tube, to within a short distance from the top, is packed with fuel pellets 11 of conventional composition, as for example uranium dioxide. The fuel pells 11 are conventionally compressed by a compression spring 12, which allows room for expansion of the pellets during use. The fuel spring 12 seats against a shoulder 13 extending from the tube wall 10 and having an opening 14 leading into a cylindrical stop member 15. Also extending upwardly from the shoulder 13 is a gas-tight bellows 16 of suitable corrosion-resistant metal. The upper end of the bellows 16 is sealed to the enlarged base 17 of a vertically displaceable pin 20. The pin base 17 has a shoulder 18 on which seats a pin compression spring 21 whose upper end bears against a closing wall of the tube 10. The upper closing wall terminates in a threaded or grooved end 22 by which the fuel element may be gripped from above by a conventional tool (not shown) for removal from the reactor core. The threaded top 22 has a central bore 23 through which extends the main body of the elongated pin 20.

The interior of the tube 10 containing the fuel is a sealed enclosure, sealed off at the top by the bellows 16 and the base of the pin 17. The outside surface of the pin structure, including the volume surrounding the bellows 16 is exposed to the reactor core environment.

Figure 3:
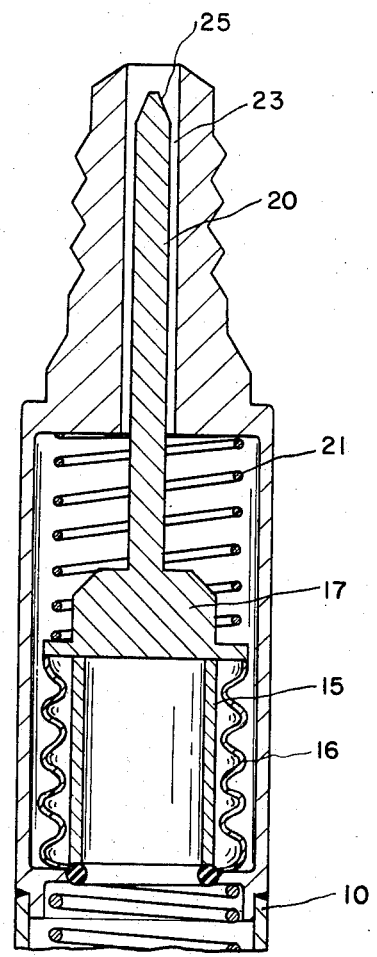
FIG. 3 is a cross-sectional view similar to FIG. 2 with the indicator showing fuel failure.

In the usual BWR or PWR, the fuel elements form part of assemblies or bundles of fuel elements, and the reactor core is made up of a plurality of such fuel assemblies. During operation, water coolant at high pressure is circulted through the core. In a typical BWR, the water pressure is about 1000 p.s.i., and about twice that for a PWR. To help offset these high external pressures, it is conventional to pressurize some fuel elements with a gas such as helium to an initial pressure of about 200–300 p.s.i. During burnup, gaseous fission products are released increasing the internal pressure above the initial value. Thus, in the absence of a leak in the fuel container 10, the internal gas pressure tending to push the displaceable pin upward, against the pressure of the spring 21, will exceed atmospheric pressure, typically by at least a factor of 10. The pin spring 21 is chosen to exert a downward force on the pin 20 exceeding atmospheric pressure by a factor of about 2–5. As previously mentioned, during reactor operation, the pressurized coolant is exerting on the pin 20 a downward pressure which exceeds atmospheric by a factor of at least 50. Thus, for the case of the operating reactor, independent of the condition of the fuel, the net force on the pin acts to push it downwardly, compressing the flexible bellows 16, until the pin base 17 hits the stop cylinder 15, which retracted condition of the pin is depicted in FIG. 3. As will be observed, the pin end 25 lies within the bore 23 below the top.

When the reactor is shut down, to rearrange or replace fuel, or to examine for fuel failures, the reactor environment or coolant pressure becomes near atmospheric pressure. If the fuel cladding is intact, which means the internal pressurization still exists, then the net force acting on the pin 20 pushes it upwardly, as depicted in FIG. 2. In this condition, the pin end 25 protrudes a short distance above the fuel pin closure 22. However, if a failure in the cladding has occurred, whether minor or major, the internal pressurization is lost and asumes that of the reactor environment, which during shutdown is near atmospheric. Thus, the net force acting on the pin 20 is that of the spring 21, which expands displacing the pin downwardly to the condition depicted in FIG. 3. Thus, after reactor shutdown, fuel elements with protruding pins as shown in FIG. 2 would have a sound cladding, whereas those with retracted pins as depicted in FIG. 3 would indicate the presence of a leak and failed fuel.

All that is necessary now is to observe visually the upper ends of the fuel elements for a retracted pin. This can be done with some fuel configurations by removing the fuel assembly from the core and examining the upper end thereof. Observation can be facilitated by adding reflectors to the pin ends 25 so their presence is more obvious. In some cases, the top closure of the fuel assembly would have to be removed to observe the fuel element ends.

Figure 5:
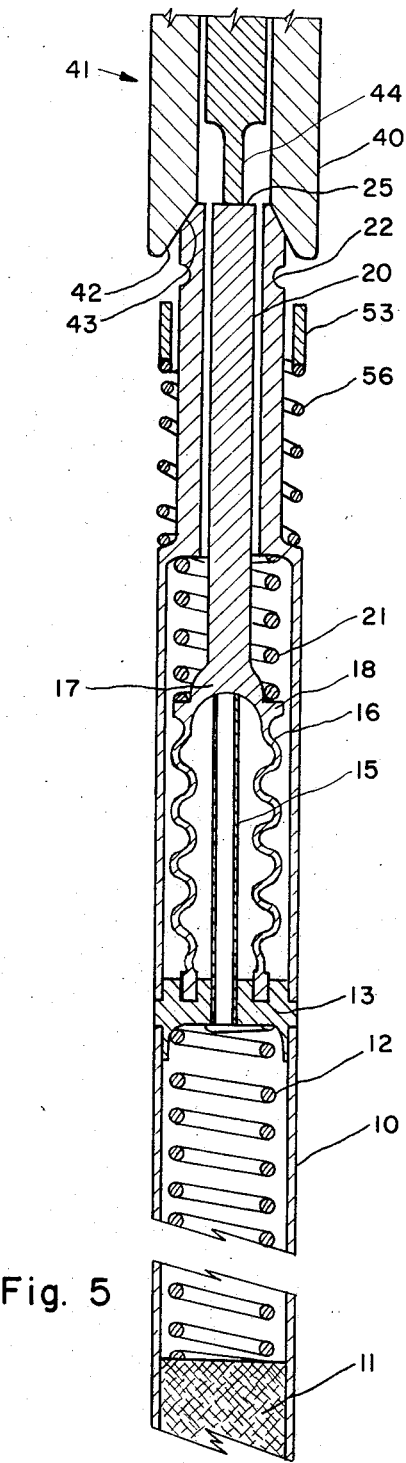
FIG. 5 is an enlarged view showing operation of the sensing device.

However, more rapid detection is possible if it can be carried out while the fuel assemblies remain in the core. In a copending application, Ser. No. 220,751, filed Jan. 26, 1972, an improved fuel assembly is described which features a top closure which is removable by a grapple while the fuel assembly remains within the core. The removal of the top closure completely opens the top of the fuel assembly, permitting either visual or mechanical or electrical indication of the extension or retraction of the index pin top 25. One convenient electrical instrument suitable for this purpose is a linear voltage differential transformer, available commercially, which is capable of sensing very small displacements of one surface relative to another. This is done by bringing a first coil-connected member into contact with one surface, say the closure tip 30 (FIG. 2), and bringing a second coil-connected member into contact with the other surface, say the pin top 25, and then measuring the inductive coupling between the coils, generating a voltage which is directly translatable into the spacing between the coils and thus the surfaces 25, 30. In a typical construction, the extent of index pin protrusion would be chosen to be about 20–50 thousandths of an inch, well within the sensitivity of the above-described displacement sensor. FIG. 5 illustrates the technique involved. The first coil is connected to a locator sleeve 40 of a sensing head 41. The locator sleeve 40 has a bevelled surface 42 for mating with a bevelled surface 43 on the tip of the fuel rod to precisely position the sensing head both radially and axially. The second coil is connected to an indicator pin 44 located within the locator sleeve and whose tip contacts the fuel rod index pin tip 25. As mentioned, the linear voltage differential transformer generates an electric signal proportional to the position of the indicator pin 44 relative to the locator sleeve 40.

Figure 4:
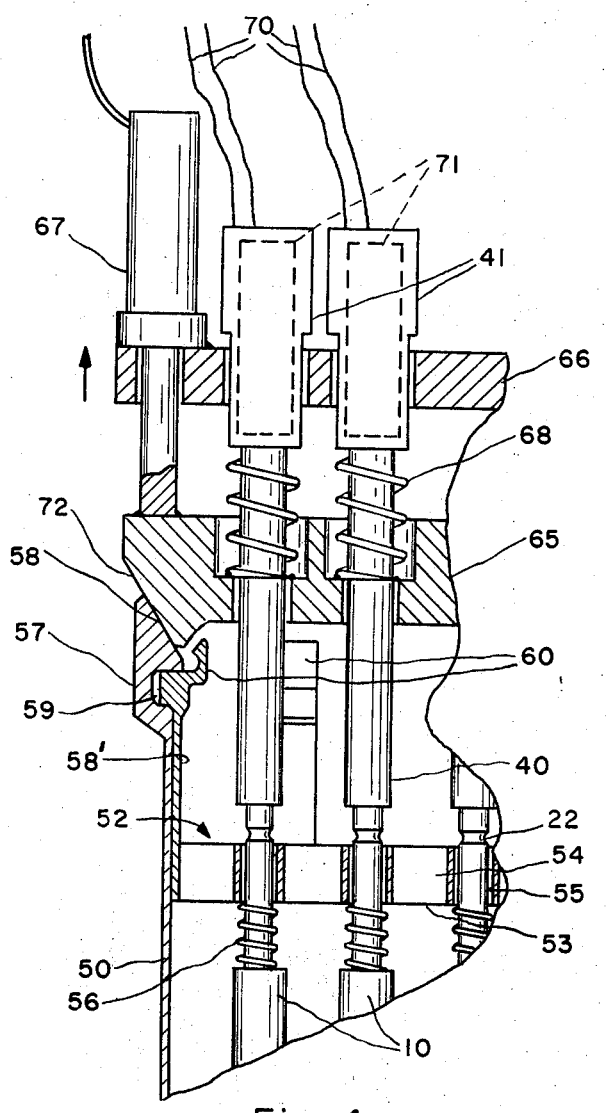
FIG. 4 is a cross-sectional, partly schematic view of an in-core failure sensing device.

While the above-described sensor can be used individually for each fuel rod, it is more economical to be able to simultaneously sense several or all of the fuel rod index pin position. One form of construction for accomplishing this is illustrated in FIG. 4. In this embodiment, the fuel assembly, only partly shown, is of the type described in said copending application, Ser. No. 220,751, and comprises a channel 50 of rectangular configuration housing a plurality of vertically disposed fuel rods 10 of the type depicted in FIGS. 1 and 5. The fuel rod positions are maintained by a top, removable closure 52, which comprises an apertured grid 53 containing apertures 54 for coolant flow and apertures 55 for receiving the upper end of the fuel rods, whose tops should desirably project above the closure 52. A spring 56 allows for expansion of the rods. As described in said copending application, the upper end 57 of the channel is provided with a tapered edge 58 for receiving a grapple (not shown) for lifting the entire fuel assembly out of the reactor core. The top closure is held in position by spring strips 58' which snap into recesses 59 in the channel top. Projections 60 on the spring strips are constructed to be engaged by a modified grapple (not shown) to disengage them from the channel and lift up and remove the top closure 52 while the assembly remains in the reactor core.

An assembly sensing device is provided which will sense the mechanical indication of failure in each individual fuel rod within an assembly but without the need for removing the top closure 52. The sensing device comprises a sensing head frame 65 supporting a number of sensing heads 41, with a lifting plate 66 and an actuating air cylinder 67. One sensing device is provided for examining an entire fuel assembly. The number and location of sensing heads 41 mounted on the sensing frame 65 corresponds to the number and location of fuel rods 10 within an assembly. Each sensing head 41, which in the preferred embodiment comprises a linear voltage differential transformer 71, is flexibly mounted on the sensing head frame 65 by a tension spring 68. The tension spring 68 is fixed to the sensing head 41 and to the sensing head frame 65 and permits motion of the sensing head both vertically and horizontally. Connected to the instrument housing and extending downward through the sensing head frame 65 is the hollow locator sleeve 40 containing the movable indicator pin, FIG. 5, which is internally connected to the instrument 71. Electrical connections 70 to each instrument transmit a signal to a readout panel (not shown) on the refueling platform (not shown) located above the reactor core. The lifting plate 66 which is moved up and down by the air cylinder 67 is used to lift the sensing heads clear of the fuel rods 10 when the device is initially being positioned.

Operation is as follows. The assembly sensing device, by means of the sensing head frame supported by a conventional hoist (not shown), is placed directly over a fuel assembly and lowered onto it, with the lifting plate 66 in the up position. A bevelled surface 72 on the sensing head frame 65 mates with the bevelled surface 58 on the fuel assembly housing 50 to provide approximate positioning of the sensing heads 41 with respect to the fuel rods 10. Once the frame is in place the air cylinder 67 is actuated which lowers the lifting plate 66 and allows the sensing heads 41 to be forced by the tension springs 68 into contact with the tops of the individual fuel rods 10 (FIG. 4). Since the precise axial position of each fuel rod is not known in advance, the tension spring 68 allows the sensing head to adjust its axial position to match the fuel rod. The bevelled surface 42 on the tip of the locator sleeve 40 mates with the bevelled surface 43 on the tip of the fuel rods to precisely position the sensing head both radially and axially, and the tip of the indicator pin 44 contacts the tip 25 of the fuel rod index pin 20. The signal from each sensing head is transmitted to the readout panel above the reactor core where the determination is made whether or not each fuel rod is leaking.

It is also possible to use similar apparatus for fuel design information and for correlation of fuel performance with burn-up, utilizing a pressure balancing method for determining absolute rod internal pressure. In this case the locator sleeve 40 is adapted to lock onto the tip of the fuel rod to form a pressure-tight seal. Then, air at a known pressure is introduced into the interior space of the locator sleeve. The air pressure is continuously increased until downward motion of the fuel rod index pin 20 is indicated by the instrument signal. Measurement of this pressure, taking into account the pressure of the index pin spring, establishes the internal pressure of the fuel rod. Information on the absolute pressure within the pin is usefuel not only for leak indication but also for burnup indication in non-leaking fuel rods and for monitoring other aspects of fuel rod design and performance.

The fuel rod configuration in FIG. 5 is similar in principle to that of FIG. 1, and the same reference numerals are employed to designate similar functioning elements. The only differences are the manner in which the parts are assembled, and their dimensions.

The failed fuel indicator is readily assembled by welding or brazing the parts together, and the unit as a whole readily added to existing fuel tube configurations by simply welding the indicator assembly, indicated generally at 35 (FIG. 1), to any standard construction.

In the embodiments described above, reference has been made to the index pin spring 21 providing the major force tending to retract the pin 20. It will however be observed that the bellows 16 is also attached to the pin 20 and can also be constructed of spring metal to function as an extension spring tending to retract the pin. Thus, in constructing the indicator, it is necessary to take into account the combined forces being exerted by both spring 21 and bellows 16 to ensure that pin retraction occurs when a leak develops. As an alternative, by sufficiently increasing the tension of the bellows 16, the spring 21 will be unnecessary and can be deleted, the bellows then supplying the sole biasing force tending to retract the pin.

There has thus been described a novel fuel element incorporating a failed fuel indicator which is responsive to loss of pressure within the element, which is a very sensitive method of detecting any magnitude of failure. When utilized in fuel assembly configurations permitting or not permitting top closure removal, direct in-core determination of failed fuel is possible without removing the fuel elements. While described in connection with a fuel element in the shape of an elongated rod or tube, it is obvious that the principles above described are applicable to any form of reactor fuel element having a pressure condition that changes whenever a failure in the fuel cladding occurs.

While the principles of the invention have now been made clear in several illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A pressure sensing device for sensing the failure of individual fuel elements within a fuel assembly, which fuel elements indicate failure by mechanical displacement of a portion thereof, comprising a sensing head frame, a plurality of sensing heads, means connected to the frame and including resilient means for mounting the sensing heads on the frame for vertical and horizontal motion relative to the frame and wherein the sensing heads depend vertically therefrom, means connected to the frame for lifting the sensing heads relative to the frame, and said sensing head frame being shaped for positioning the latter relative to the fuel assembly and for preliminarily aligning the sensing heads with the fuel elements, said sensing heads each incorporating means for coupling to a fuel element and for indicating the displacement of its failure-indicating portion.

2. A device as set forth in claim 1 wherein the sensing head comprises a linear voltage differential transformer.

3. A sensing device as set forth in claim 1 and comprising means on each sensing head for locating same relative to the fuel element.

4. A sensing device as set forth in claim 3 in combination with a fuel element having locating means for coacting with the locating means on the sensing head.

5. The combination of claim 4 wherein sensing heads are provided equal in number to the number of fuel elements in the fuel assembly.

6. The combination of claim 5 wherein each sensing head comprises means for converting displacement of the failure-indicating portion into an electrical signal.

References Cited

UNITED STATES PATENTS

| | | | |
|---|---|---|---|
| 3,321,370 | 5/1967 | Oppenheimer | 176—19 R |
| 2,368,564 | 1/1945 | Pascoo | 73—146.2 |
| 3,496,775 | 2/1970 | Sargent | 73—398 R |
| 2,718,145 | 9/1955 | Nisle | 73—4 R |
| 3,115,780 | 12/1963 | Jurisch | 73—388 R |

FOREIGN PATENTS

| | | | |
|---|---|---|---|
| 1,100,723 | 1/1968 | Great Britain | 176—19 LD |

HARVEY E. BEHREND, Primary Examiner

U.S. Cl. X.R.
73—398; 176—80